(12) United States Patent
Rivera

(10) Patent No.: US 12,394,947 B2
(45) Date of Patent: *Aug. 19, 2025

(54) MULTIPURPOSE WALL OUTLET

(71) Applicant: Manolo Fabio Rivera, Elmhurst, NY (US)

(72) Inventor: Manolo Fabio Rivera, Elmhurst, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,038

(22) Filed: Feb. 8, 2024

(65) Prior Publication Data

US 2024/0356289 A1     Oct. 24, 2024

Related U.S. Application Data

(63) Continuation of application No. 16/808,568, filed on Mar. 4, 2020, now Pat. No. 11,978,985.

(51) Int. Cl.

| | |
|---|---|
| *H01R 13/66* | (2006.01) |
| *H01R 24/76* | (2011.01) |
| *H01R 27/00* | (2006.01) |
| *H04B 1/38* | (2015.01) |
| *H04L 12/10* | (2006.01) |
| *H01R 27/02* | (2006.01) |
| *H01R 103/00* | (2006.01) |

(52) U.S. Cl.
CPC ......... *H01R 13/6675* (2013.01); *H01R 24/76* (2013.01); *H01R 27/00* (2013.01); *H04B 1/38* (2013.01); *H04L 12/10* (2013.01); *H01R 27/02* (2013.01); *H01R 2103/00* (2013.01)

(58) Field of Classification Search
CPC ............ H01R 13/6675; H01R 2103/00; H01R 24/76; H01R 27/00; H01R 27/02; H04B 1/38; H04L 12/10

See application file for complete search history.

(56) References Cited

FOREIGN PATENT DOCUMENTS

| CN | 103066849 | * | 4/2013 | ............ H02M 3/335 |
|---|---|---|---|---|
| CN | 202949120 | * | 5/2013 | ............ H01R 13/66 |
| TW | 200521659 | * | 7/2005 | |
| TW | 200815974 | * | 4/2008 | ............... G06F 1/26 |

* cited by examiner

*Primary Examiner* — Zhiyu Lu
(74) *Attorney, Agent, or Firm* — Manolo F. Rivera; Manolo Fabio Rivera

(57) ABSTRACT

A multipurpose wall outlet comprises a support structure having a front side and a rear side configured for mounting to or plugging into a wall outlet receptacle. The support structure includes at least one electrical outlet providing AC power and at least one USB output port. A circuit board and an electronic module comprising a smart chip are mounted to the structure. The smart chip is configured to regulate and convert electrical power from an AC power source into direct current (DC) power. A bridge is mounted on the circuit board and coupled to a voltage controller, which divides the DC current into negative and positive components and distributes power to electrical components, including the USB port. The smart chip controls the voltage of the converted output to the USB.

2 Claims, 16 Drawing Sheets

MULTIPURPOSE WALL OUTLET

STATEMENT REGARDING FEDERALLY SPONSORED RESEARCH

N/A

FIELD OF THE INVENTION

The present invention relates to wall outlet devices for providing electric power, including via USB ports. In some embodiments, the device may also provide internet connectivity. In other embodiments, the multipurpose wall outlet may be configured for surface mounting over an existing wall outlet or for plug-in connection using built-in connector or mounting brackets.

BACKGROUND OF THE INVENTION

Existing wall outlets generally are devices that provide power to electronic devices via a power socket. In the United States, standard wall outlets generally provide power via a two-pronged socket with an optional grounding element. With the proliferation of modern devices such as smart phones, tablet computers, media players and the like, the standard wall outlet has lost some of its utility as these devices are often charged via connection to a universal serial bus (USB) port.

The universal serial bus (USB) is a transmission standard developed in the early nineties which supports plug-and-play as well as hot-plugging. The USB enables higher transmission speeds than other buses and it allows for unplugging of a device without the need for executing complicated applications. For these reasons the USB standard has become a popular connection modality for supplying data and power connections between devices. Most computer peripherals and smart devices such as printers, hard drives, mice, keyboards and the like use a USB connector to connect with a computer. The USB provides a uniform connector for various peripherals, including power supply interfaces, communication interfaces, video output devices, audio input devices, data storage devices and the like. Because of the proliferation of devices that rely on USB connections to provide power, the limited USB ports provided on computers are often insufficient to provide adequate connections to meet users' needs.

The proliferation and ubiquity of internet ready devices has given rise to a variety of wireless data transmission modalities. WiFi is a technology that allows an electronic device to exchange data or connect to the internet wirelessly using, for example, 2.4 GHz UHF and 5 GHz SHF radio waves. "WiFi" is a trade named that is generally defined as any wireless local area network ("WLAN") products that are based on the IEEE 802.11 standards. Because most WLANs are based on these standards, the term WiFi is generally used as a synonym for WLAN. Other wireless data transmission modalities rely on cellular networks such as 1g, 2g, 3g, 4g, 5g, (collectively "nG"), LTE, and WiMax to provide internet connections to wireless devices.

In addition to wireless data transmission, wired data transmission also plays an important role in providing internet connectivity to devices. Ethernet is the family of computer networking technology for local area networks ("LAN"). Systems communicating over Ethernet divide a stream of data into shorter pieces called "frames". Each frame contains source and destination addresses and error checking data so that transmitted data maintains its integrity.

Because many modern electronic devices require both power and an internet connection to function properly there is a need in the art for an inclusive device that will provide a power source as well as a connection to the internet.

While many electronic devices benefit from both power and internet connectivity, in other cases such as hotels, hospitals, or office environments users may only require reliable, regulated USB or AC power delivery. Therefore, there remains a need for wall outlet devices capable of regulated electrical power delivery, including smart-chip controlled USB outputs, regardless of whether network connectivity is present.

SUMMARY OF THE INVENTION

To address the unmet needs in the art, the invention disclosed herein is a multipurpose wall outlet for mounting in a wall at a predetermined location. The multipurpose wall outlet comprises a housing adapted to hold the various components of the multipurpose wall outlet and is adapted for mounting in a building wall at a predetermined location, the housing further comprising a front side, a back side and an enclosing side wall, wherein the front side of the housing further comprises at least one opening at least one wired connection port, the at least one wired connection port may be, alone or in combination, at least one electrical socket, at least one a USB port and at least one ethernet jack; an electrical connection for connecting the multipurpose wall outlet to a source of power; a multi function printed circuit board (PCB) operatively connected to the electrical connection; at least one electrical socket operatively connected to the electrical connection; at least one USB port operatively coupled to the PCB; and at least one ethernet port operatively coupled to the PCB.

The invention of the present disclosure is an electrical outlet adapted to be mounted to/within a wall. The outlet is capable of providing electrical power via both standard plug elements as well as via USB connections. In some embodiments, the electric outlet may also provides a network connection, such as via cellular (nG, LTE, WiMAX) or wireless (WiFi) modalities When present, the network connection may allow the invention to function as a gateway or "hot spot" to allow internet capable devices to connect to the network. In other embodiments, the device operates solely as a regulated power outlet, without any internet or wireless data functions. In other embodiments, the multipurpose wall outlet may be configured for surface mounting over an existing wall outlet or for plug-in connection using built-in connector or mounting brackets.

DETAILED DESCRIPTION

Figure 1:
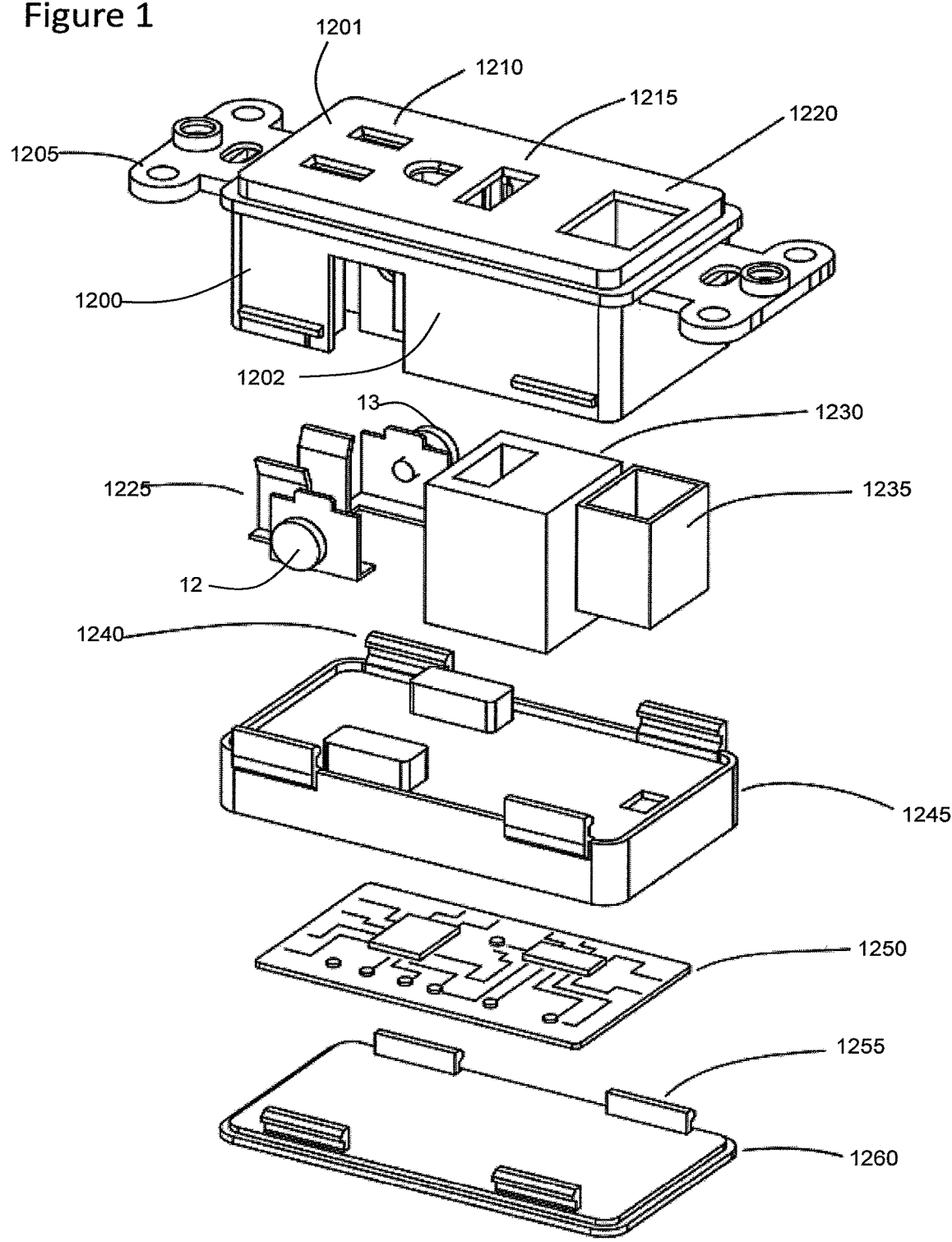
FIG. 1 shows an exploded view of an illustrative embodiment of the multipurpose wall outlet illustrating its various components and how they fit together.

The device may comprise a housing into which the various other components are placed. The housing may be adapted to fit within standard cut outs for wall outlets and fit within standard wall mount plates for standard electrical outlets. The device may further comprise a face plate with openings suitable for accepting various wired connections such as standard plugs, USB plugs, phone cord jacks R11, ethernet cords RJ45 or the like either alone or in various combinations. The face plate may further comprise a slot or opening through which a SIM card may be engaged with the device.

The device further comprises adaptations for establishing various forms of wired connections and wireless connections. The wired and wireless connections may provide power and/or network connectivity to various other devices.

Power is supplied to the outlet of the present invention via a standard connection to a power grid such as by being hard wired to an electrical circuit of a building. The hard wired electrical connection is operatively coupled to wired connection plugs capable of providing electrical connections to external devices, such as, for example 110v and/or 125 v, USB or the like. A suitable converter within the device may convert the electricity received from the building's power grid to a frequency capable of being delivered by a USB connection, as in, for example 5 vdc, 7 vdc, 9 vdc. Various AC/DC converters and or analog/digital converters, and or grounds, may be present in the device in order to maximize power delivery options.

In some embodiments, the multipurpose wall outlet does not include any network connectivity and operates solely to provide AC and/or USB power output. Network connectivity to the outlet may be supplied wirelessly as in, for example, by a cellular connection or a WiFi connection. Once the outlet has established a network connection, the outlet may serve as a gateway, hub, or "hot spot" for other internet capable devices or devices that benefit from some kind of network connection. Other internet capable devices or networkable devices, may connect to the network, via the outlet, by wireless or wired connections. For example, R11 jack(s), RJ35 jack(s), USB ports or the like. Wireless connections may also be established, as in for example by broadcasting a WiFi signal and receiving WiFi data from connected devices. Network connectivity may be supplied to the outlet by a wired connection such as cable, fiber optic, or other protocol known to those skilled in the art.

The multipurpose wall outlet comprises a housing adapted to hold the various components of the multipurpose wall outlet and is adapted for mounting in a building wall at a predetermined location, the housing further comprising a front side, a back side and an enclosing side wall, wherein the front side of the housing further comprises at least one opening at least one wired connection port, the at least one wired connection port may be, alone or in combination, at least one electrical socket, at least one a USB port and at least one ethernet jack; an electrical connection for connecting the multipurpose wall outlet to a source of power; a multi function printed circuit board (PCB) operatively connected to the electrical connection; at least one electrical socket operatively connected to the electrical connection; at least one USB port operatively coupled to the PCB; and at least one ethernet port operatively coupled to the PCB.

Turning now to a detailed description of the figures. FIG. 1 shows an exploded view of an illustrative embodiment of the multipurpose wall outlet illustrating its various components and how they fit together. The various components of the multipurpose wall outlet are assembled in a housing. The housing is further comprised of a top portion (1200) which further comprises a mounting bracket (1205) for mounting to the wall of a structure, an enclosing side wall (1202) a front side (1201) wherein the front side further comprises a plurality of openings for at least an electrical socket connection (1210), a USB connection (1215) and an ethernet connection (1220). The housing further comprises an intermediate mounting portion (1245) for holding the various electrical components in place. The intermediate mounting portion (1245) connects to the top portion via a connector (1240) that snaps into place and holds the two portions firmly together. An electrical socket assembly (1225), USB port assembly (1230) and ethernet jack assembly (1235) are mounted on the intermediate mounting portion. As different countries use electrical socket assemblies of varied configurations, the electrical socket assembly chosen for incorporation into the multipurpose wall outlet should be whatever electrical socket assembly is used in the region where the multipurpose wall outlet will be used. The electrical socket assembly may be any electrical socket assembly used throughout the world. The electrical socket assembly is operatively connected to a source of electric current to provide power to the multipurpose wall outlet. The USB port assembly (1230) and the ethernet jack assembly (1235) are operatively connected to a multi function printed circuit board (PCB) (1250). The PCB (1250) is operatively connected to the electrical socket assembly (1225) in order to provide power to the various electrical components of the PCB. The PCB is mounted to a back plate portion (1260) of the housing. The back plate portion (1260) connects to the intermediate mounting portion via a back plate portion connector (1255) that connects to a corresponding connector in the intermediate mounting portion (1245)

Figure 2:
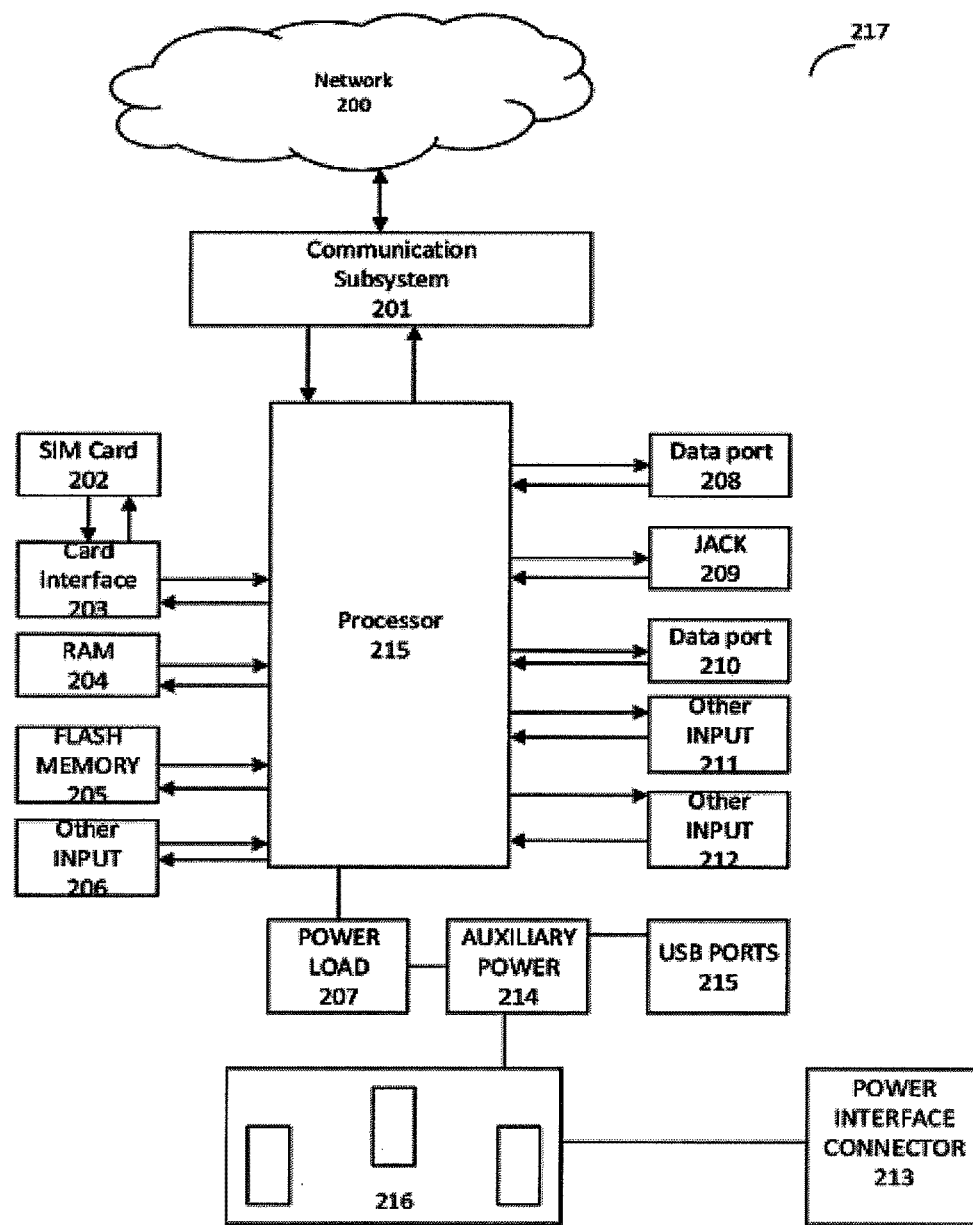
FIG. 2 shows a schematic representation of the various components of the multipurpose wall outlet.

Turning now to a description of the function of the multipurpose wall outlet. FIG. 2 shows a schematic representation of the various components of the multipurpose wall outlet. A power interface connector (213) connects to a source of electrical current from the building or structure in which the multipurpose wall outlet is to be mounted. The power interface connector (213) is operatively connected, such as for example by wiring it to an electrical socket assembly (216). The electrical socket assembly (216) is operatively connected to an auxiliary power component (214) which, in turn is operatively connected to a power load component (207) and at least one USB port assembly (215). Alternatively, the power interface connector may be directly connected to the auxiliary power component and/or the power load component in order to bypass the electrical socket and input current directly to the auxiliary power component and/or the power load component respectively. The power load component (207) is operatively connected to a processor (215) in order to provide power to the various electrical components of the multipurpose wall outlet. The processor (215) is operatively connected to various functional components to in order to provide the multiple functions of the present invention. The various functional components may include, in various combinations a communication subsystem (201) which is in communication with a wireless data network (200), an ethernet data port (210), an RJ11 VOIP telephony jack (209), a card reader interface (203) suitable for reading a SIM card (202), a RAM memory component (204), a flash memory component (205), other data ports (208) and other inputs (206, 211, 212).

Figure 3:
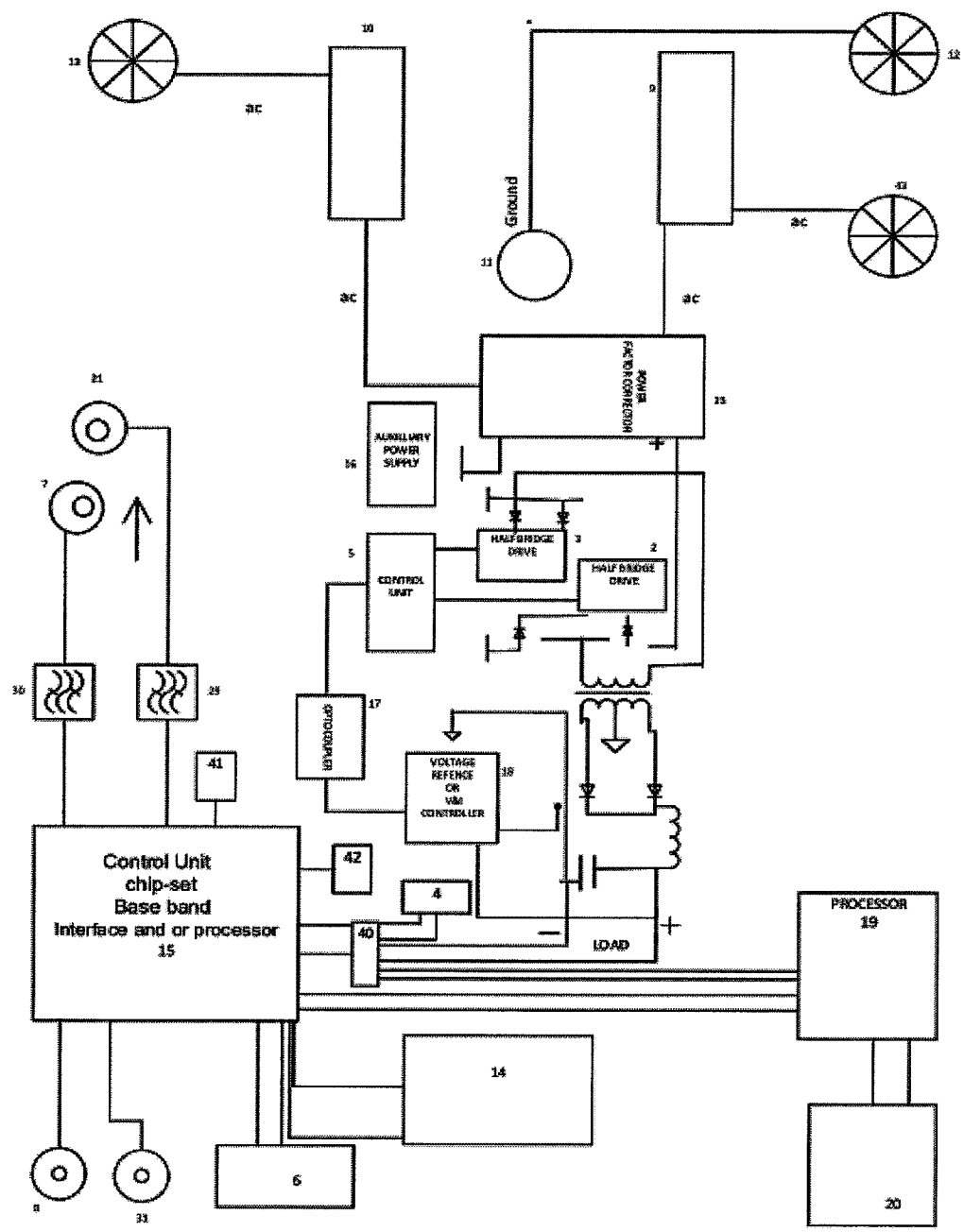
FIG. 3 shows, a functional schematic of an operative embodiment of the multipurpose wall outlet.

Turning now to FIG. 3, a functional schematic of an operative embodiment of the multipurpose wall outlet. Electrical wiring providing AC power is connected to the multifunction wall outlet at connection terminals (12, 13) providing power to the multipurpose wall outlet. AC current may be provided at 120/240/50/60 hz. The connection to the terminals (12, 13) may be accomplished by a connector such as screws or other suitable connection such as soldering. At least one electrical socket assembly (9, 10, 11) is operatively connected to the terminals via any connection method known to those having skill in the art, such as by wires. A printed circuit board further comprising various electrical components, is operatively connected to the connection terminals such that current can be provided to the PCB. The current enters the PCB at a power factor corrector (23) which adjusts the flow of current into the PCB. The power factor corrector (23) is connected to an auxiliary power supply (16) and at least one half bridge (2, 3). The at least one half bridge (2, 3) is connected to a control unit (5). The control unit (5) may be a smart chip to convert AC current to DC current or vice versa. The control unit (5) is connected to an optocoupler (17) which bridges the current to the voltage controller (18) which divides the current into negative and positive components. The voltage controller (18) is connected to a distributor (40) which distributes power to various components of the PCB and the multipurpose wall outlet. For example, the distributor (40) sends power to at least one USB port (4), a VOIP processor (19) and/or the control unit chip set base band interface and processor (15). The VOIP processor (19) may be a voice or data or VOIP processor. The processor's functions will be defined by software installed on the processor.

A wireless data signal is received by the multipurpose wall outlet via at least one antenna operatively coupled to the PCB. The wireless data signal may be a WLAN (WiFi) signal, a cellular signal, or any other wireless data signal known to those having skill in the art or later invented. The invention specifically contemplates receiving cellular wireless data signals referred to as 1G, 1.5G, 2G, 2.5G, 3G, 3.5G, 4G, 5G, (collectively "nG") long term evolution (LTE), worldwide interoperability for microwave access (WiMax), and the like. The wireless data signal is received by at least one antenna (7, 8, 21, 31) such as a sub miniature version A (SMA) or U.FL. The signal is then sent to at least one amplifier filter (29, 30) and then sent to a processor (15). The processor (15) in this embodiment is a system on a chip (SOC) further comprising software enabling the SOC to make switches, provide router functions and provide network security by, for example, media access control (MAC), physical layer (PHY) wireless local area network (WLAN), WiFi Protected Access (WPA), Advanced Encryption Standard (AES), Wired Equivalent Privacy (WEP). The processor (15) converts the received signal to data or high speed internet. In the case where the wireless data signal received is from a cellular network that requires subscriber information the processor will communicate with a subscriber information module (SIM) (14) which may be a memory socket, SIM card socket, SIM card 6POS NANO which is in communication with a processor (15) which will receive authorization from the cellular provider. The signal is then sent to (6) which may be an RJ45 ethernet port, CAT5 connector, Modular Plug, 8POS, 8CONTACT, 1 Port or the like to provide data. The signal can also be sent to transmitting antenna (8, 31) providing wireless data network connectivity to wireless internet enabled devices. The SOC through its connections with the transmitting antenna(s) is able to serve as a repeater, bridge and/or router. The control unit chip set base band interface and/or processor (15) may then output the signal to a voice over internet protocol (VOIP) processor (19). The VOIP processor communicates bidirectionally with the telephony jack (20) which may be an RJ11 jack, a modular jack, 6POS, 1PORT or other suitable port. Memory components (41, 42) help to speed up processing and provide other functions such as providing storage for media files such as for example, music, photos, video, as well as software for installing on other devices. A user interface, such as a control panel with an on/off button and reset button can be used to turn the PCB on or off.

Figure 4:
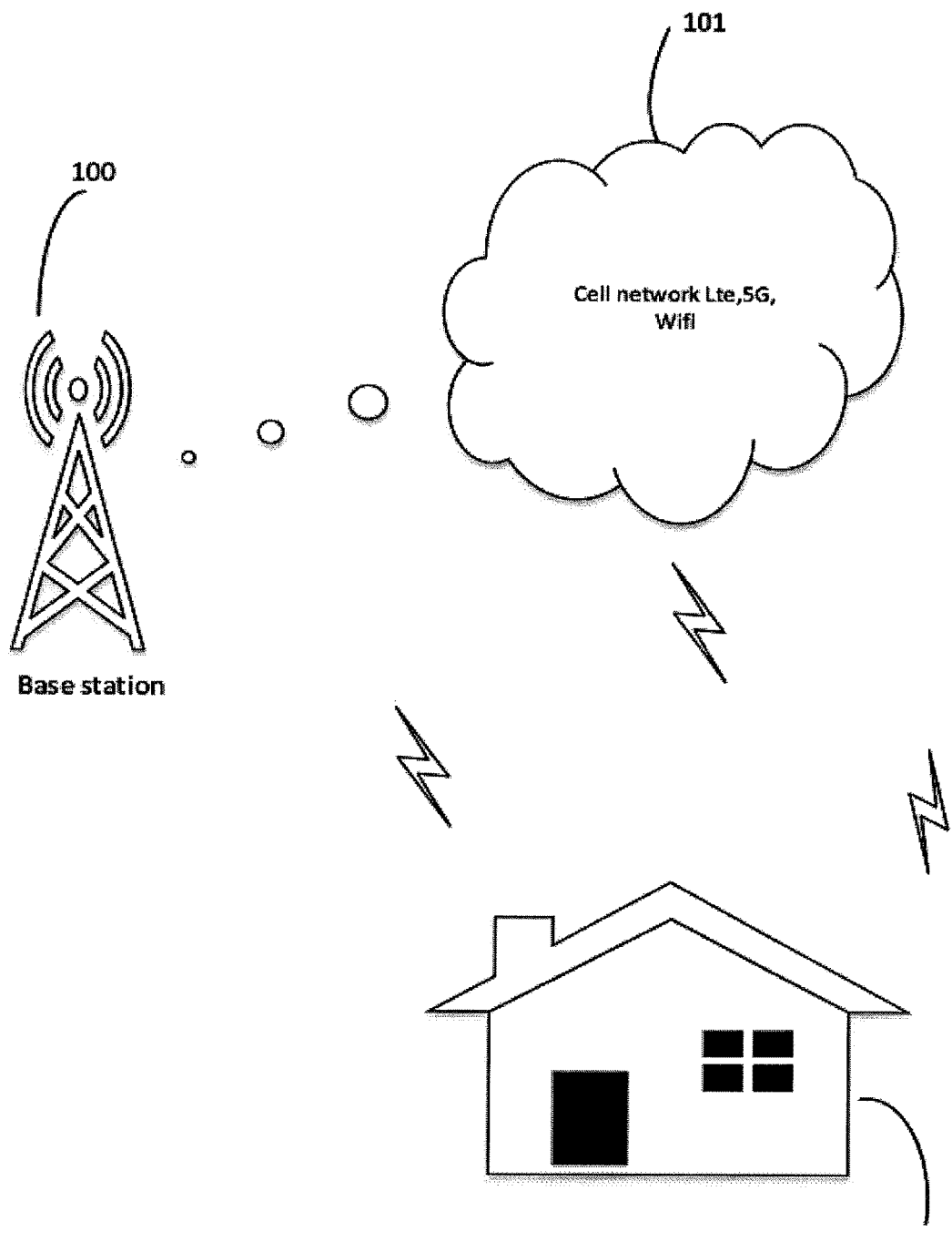
FIG. 4 shows the path of a wireless data signal to a building in which the multipurpose is installed.

Turning now to illustrating the multipurpose wall outlet in use. FIG. 4 shows the path of a wireless data signal to a building in which the multipurpose is installed. A base station (100) transmits a wireless data signal (101) such as a cellular signal (nG, LTE) or WLAN (WiFi) to a building (102) wherein there is a need for data connectivity. The types of data connectivity needed may be internet connections, VOIP connections or other data connections. The types of buildings that may have a need for such data connections include, homes, businesses, schools, hospitals, government buildings or any other organization that has a need for a data connection.

Figure 5:
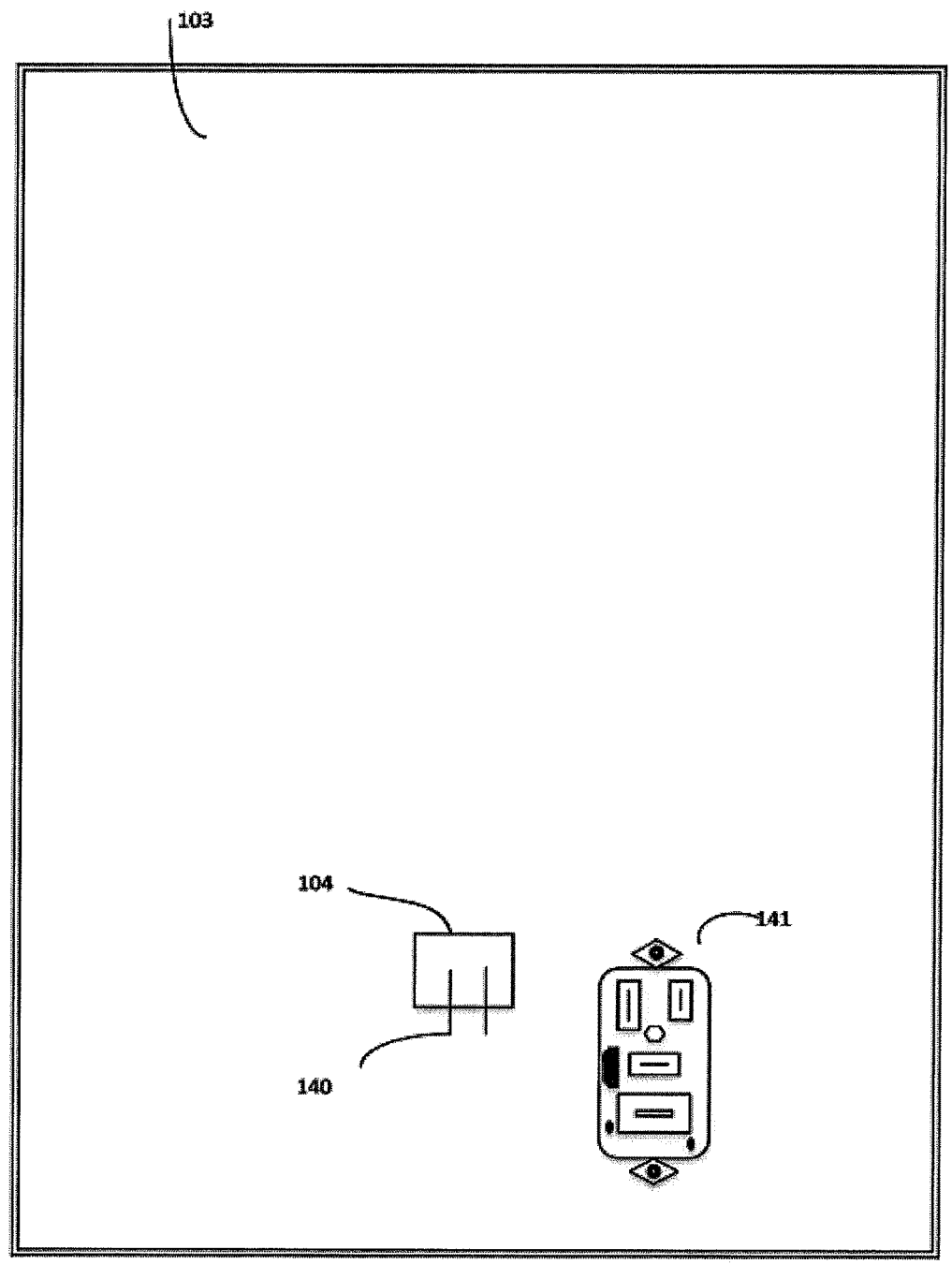
FIG. 5 shows the mounting of the multipurpose wall outlet in a predetermined location on a building wall.

FIG. 5 shows the mounting of the multipurpose wall outlet in a predetermined location on a building wall. A building wall (103) is selected as a location for the mounting of the multipurpose wall outlet. The site of insertion may be selected based on the building's wiring plan so as to choose a location that has wired connections to the building's AC power grid. A cutout (104) is formed in the wall to accept the multipurpose wall outlet. In other embodiments, the multipurpose wall outlet may be configured for surface mounting over an existing wall outlet or for plug-in connection using built-in connector or mounting brackets. The building's AC wiring (140) is connected to the multipurpose wall outlet (141) at the connection terminals on the multipurpose wall outlet.

Figure 6:
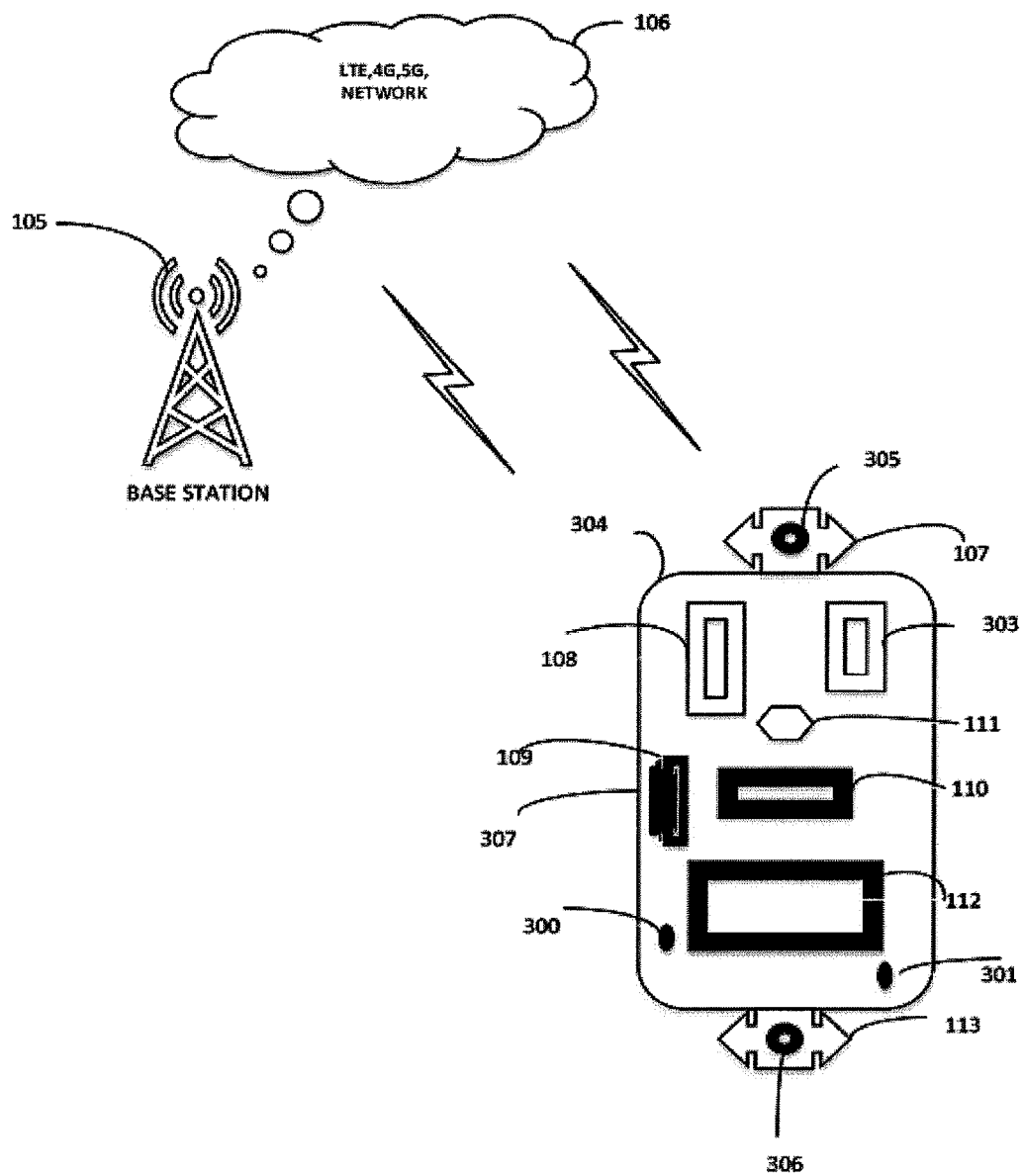
FIG. 6 shows a detailed view of the front portion of an embodiment of the multipurpose wall outlet and how the multipurpose wall outlet communicates with a wireless data network.

FIG. 6 shows a detailed view of the front portion of an embodiment of the multipurpose wall outlet. In an embodiment the wireless wall outlet comprises a receiver and transmitter for communicating with a wireless data network (106) that is broadcast from a base station (105). Any wireless data network such as LTE (Long-Term Evolution) or 5G generation mobile networks or 4g or Global System for Mobile Communication (GSM) or General Packet Radio Services (GPRS) Enhanced Data GSM Environment standards.or (EDGE) or Universal Mobile Telecommunications Service (UMTS) or Code Division Multiple Access (CDMA) CDMA2000 networks.or 802.11, or Mobitex™ or Personal Communication Systems (PCS) or Time Division Multiple Access (TDMA) systems. WiMAX 802.16m 3g or 1g, 2g, may be used. Antenna (300) receives the wireless data signal. The signal is sent to a processor which is in communication with a SIM card disposed within a SIM card reader (307) for acquiring and communicating subscriber information. The signal is then sent to a multifunction printed circuit board (PCB). When authorized the signal is sent to an external antenna (300, 301) which communicates the wireless link which is transmitted by the base station, which transmits and receives voice and data signals. Mounting brackets (113, 107) provide a secure platform for mounting the multipurpose wall outlet to a wall in a structure in need of internet connectivity and power supply functions. Round, square or other shaped openings (306) for mounting functions. A power button (304) allows a user to turn the multipurpose wall outlet on and off.

Figure 7:
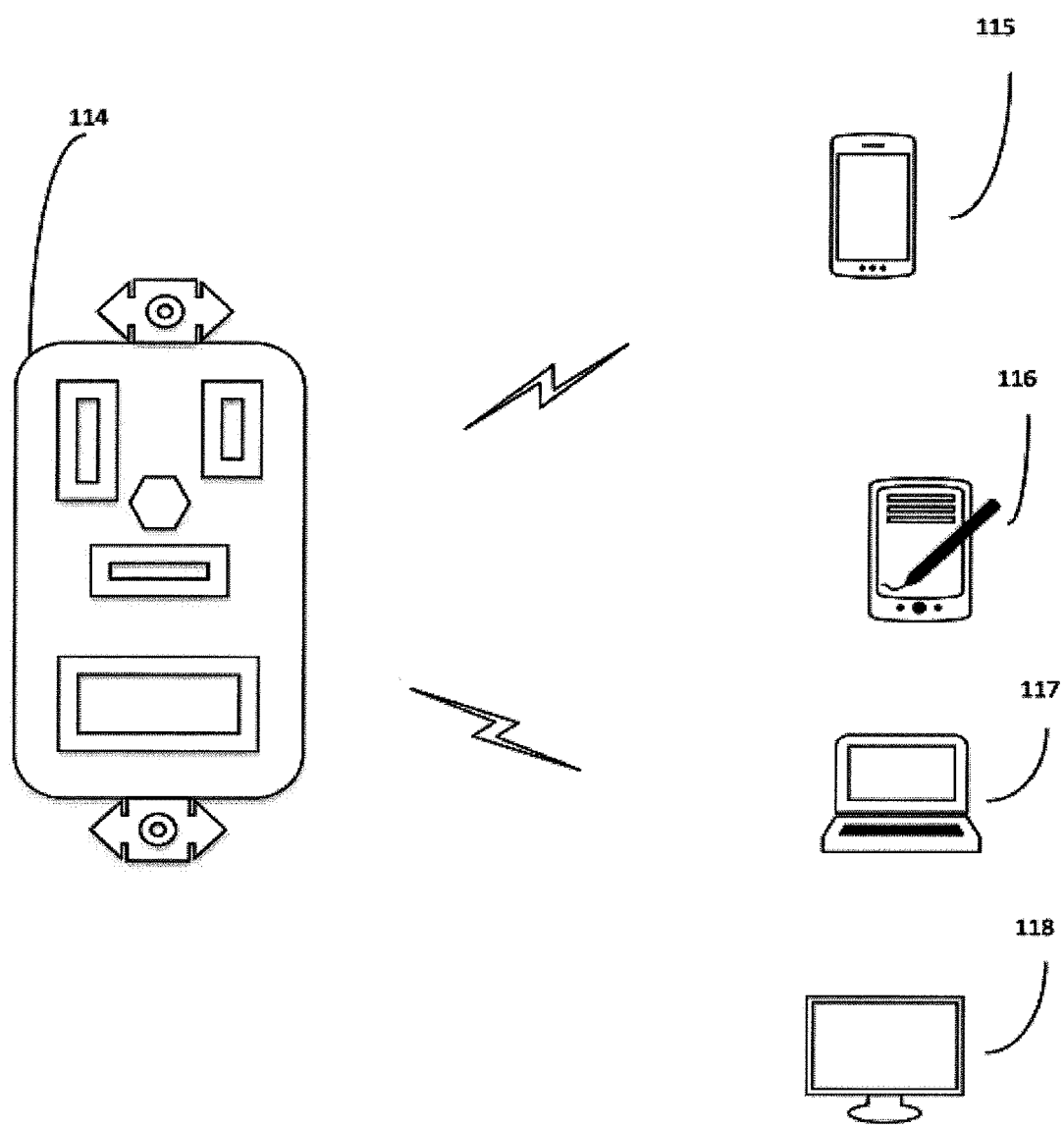
FIG. 7 shows the multipurpose wall outlet providing wireless internet connectivity to various devices.

A base station (105) transmits a wireless data network (106) which is received by the at least one antenna, such as an external antenna (in the multipurpose wall outlet. The multipurpose wall outlet can then provide numerous functions by the addition of various components. Shown here, the multipurpose wall outlet provides FIG. 7 illustrates the multipurpose wall outlet (114) providing wireless internet connectivity to various devices such as smart phones (115), tablets (116), laptop computers (117) and desktop computers (118).

Figure 8:
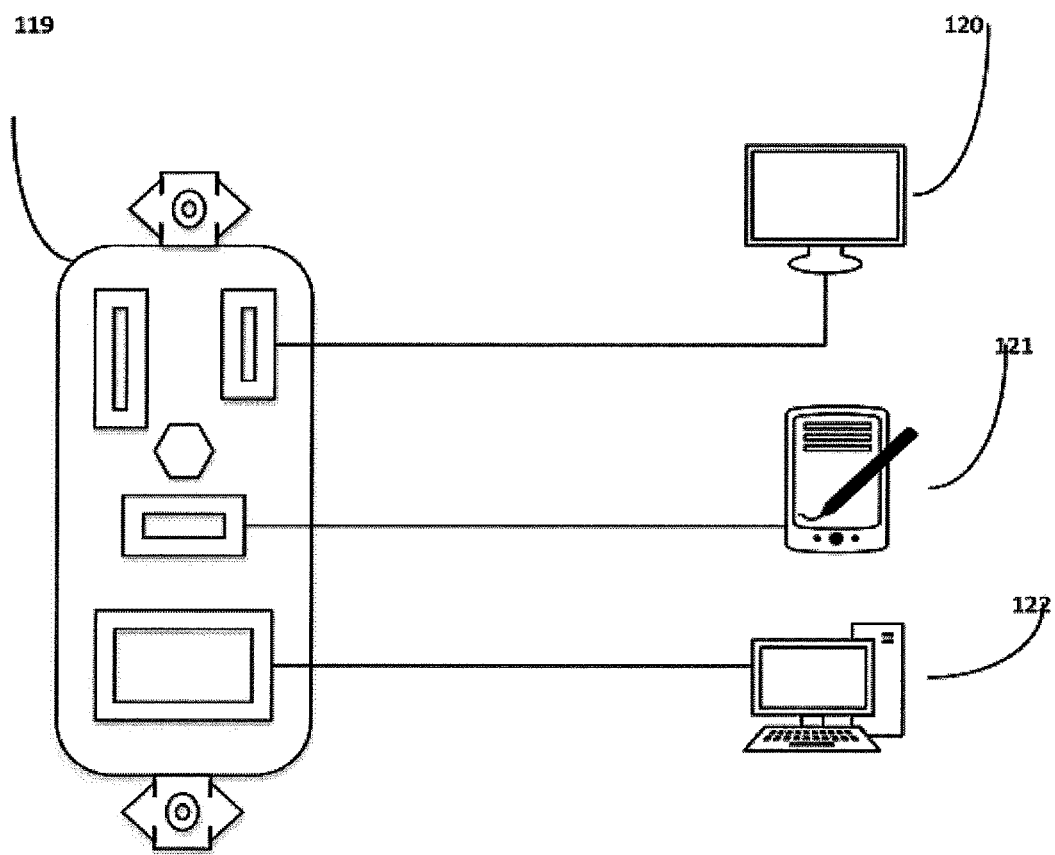
FIG. 8 shows the multipurpose wall outlet in use providing power and connectivity to various devices.

FIG. 8 illustrates the multipurpose wall outlet (119) providing power to a desktop computer (120) through the electrical socket, providing power to a smart phone (121) through the USB port, and providing a wired internet connection to a desktop computer through a wired internet port such as an ethernet jack.

Figure 9:
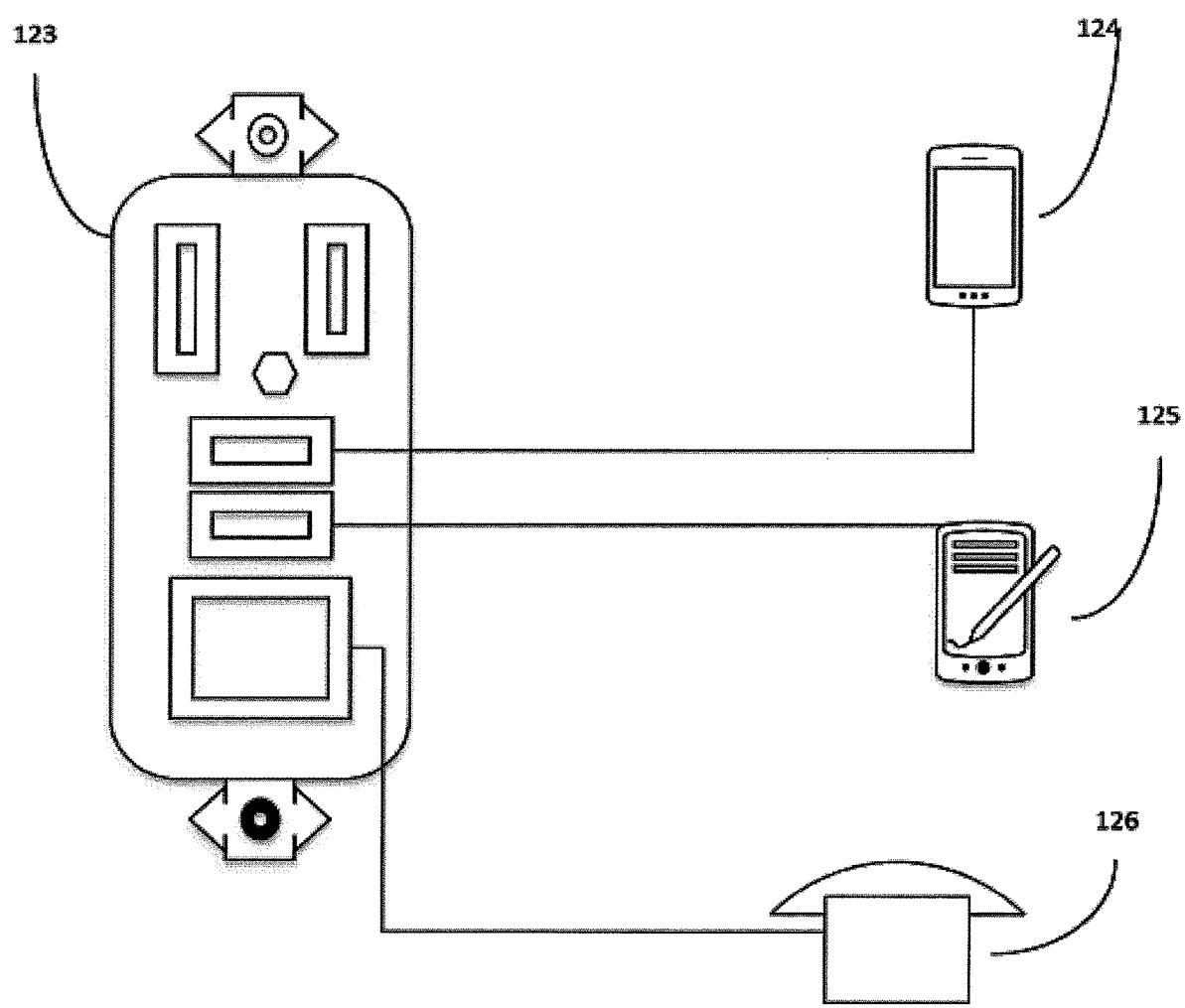
FIG. 9 shows the multipurpose wall outlet in use providing power and connectivity to various devices.

FIG. 9 illustrates the multipurpose wall outlet (123) providing USB mediated power to two devices (124, 125) while providing a wired VOIP telephony connection to a telephone (126). FIG. 9 depicts an embodiment of the invention operating without internet connectivity, providing only regulated power to two USB-connected devices.

Figure 10:
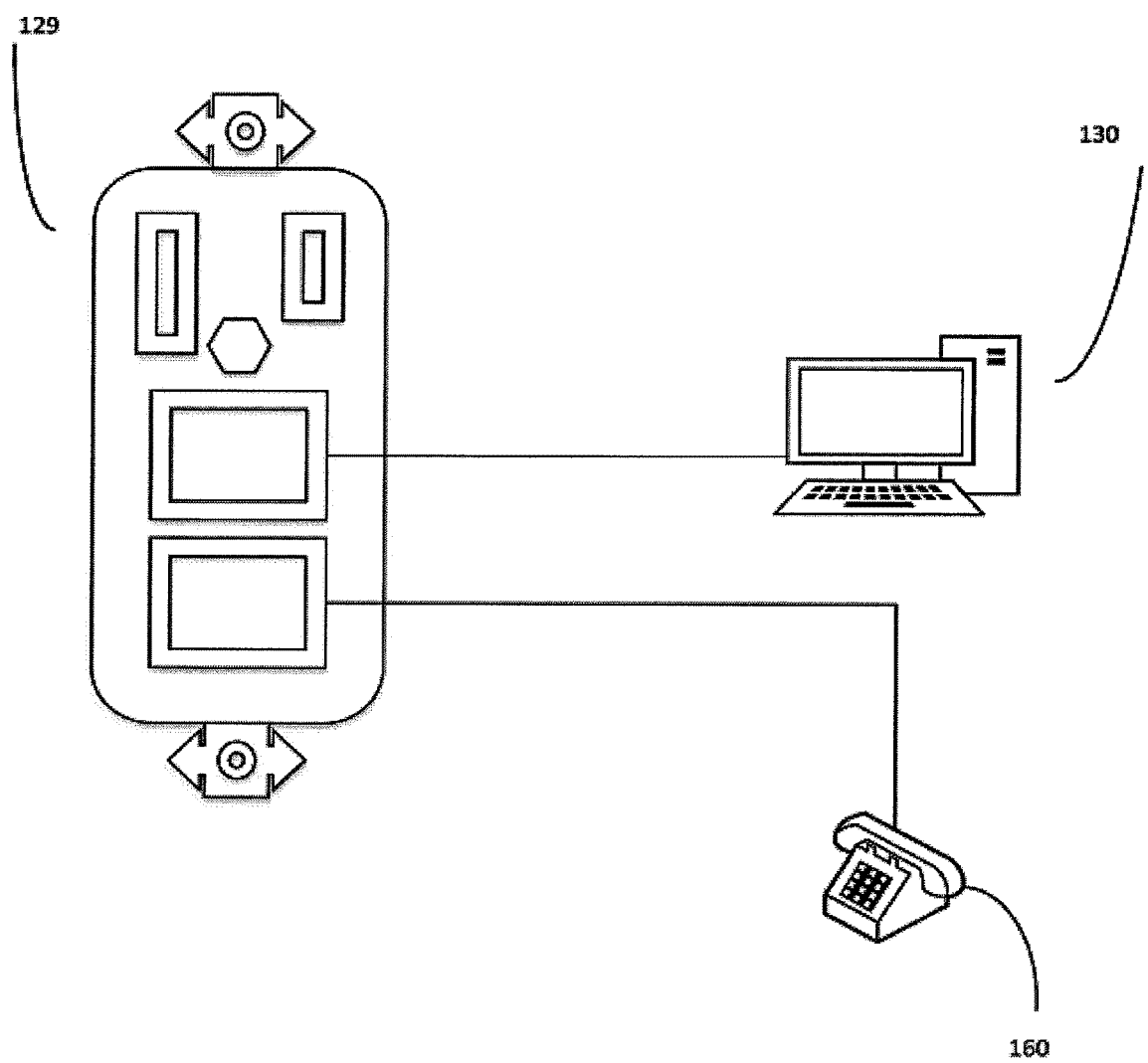
FIG. 10 shows the multipurpose all outlet providing a wired internet connection and a VOIP connection.

FIG. 10 shows the multipurpose wall outlet (129) providing a wired internet connection to a desktop computer (130) and a VOIP connection to a telephone (160).

Figure 11:
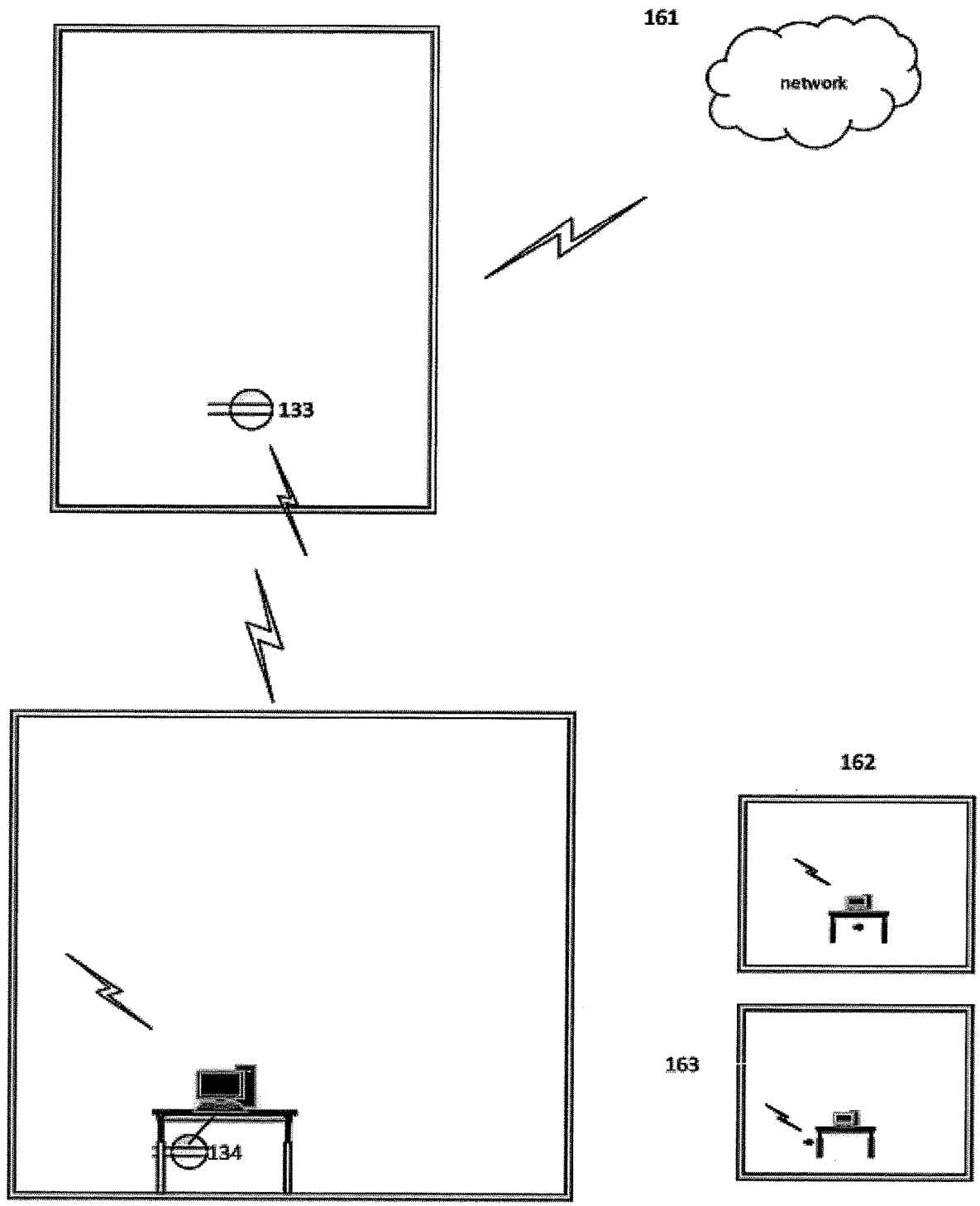
FIG. 11 shows the repeater/bridge function of the multipurpose wall outlet.

FIG. 11 illustrates the repeater/bridge function of the multipurpose wall outlet. A wireless data signal (161) is received by the multipurpose wall outlet (133). Various multipurpose wall outlets installed in various rooms communicate with each other as repeaters or bridges proving a robust data connection.

Figure 12:
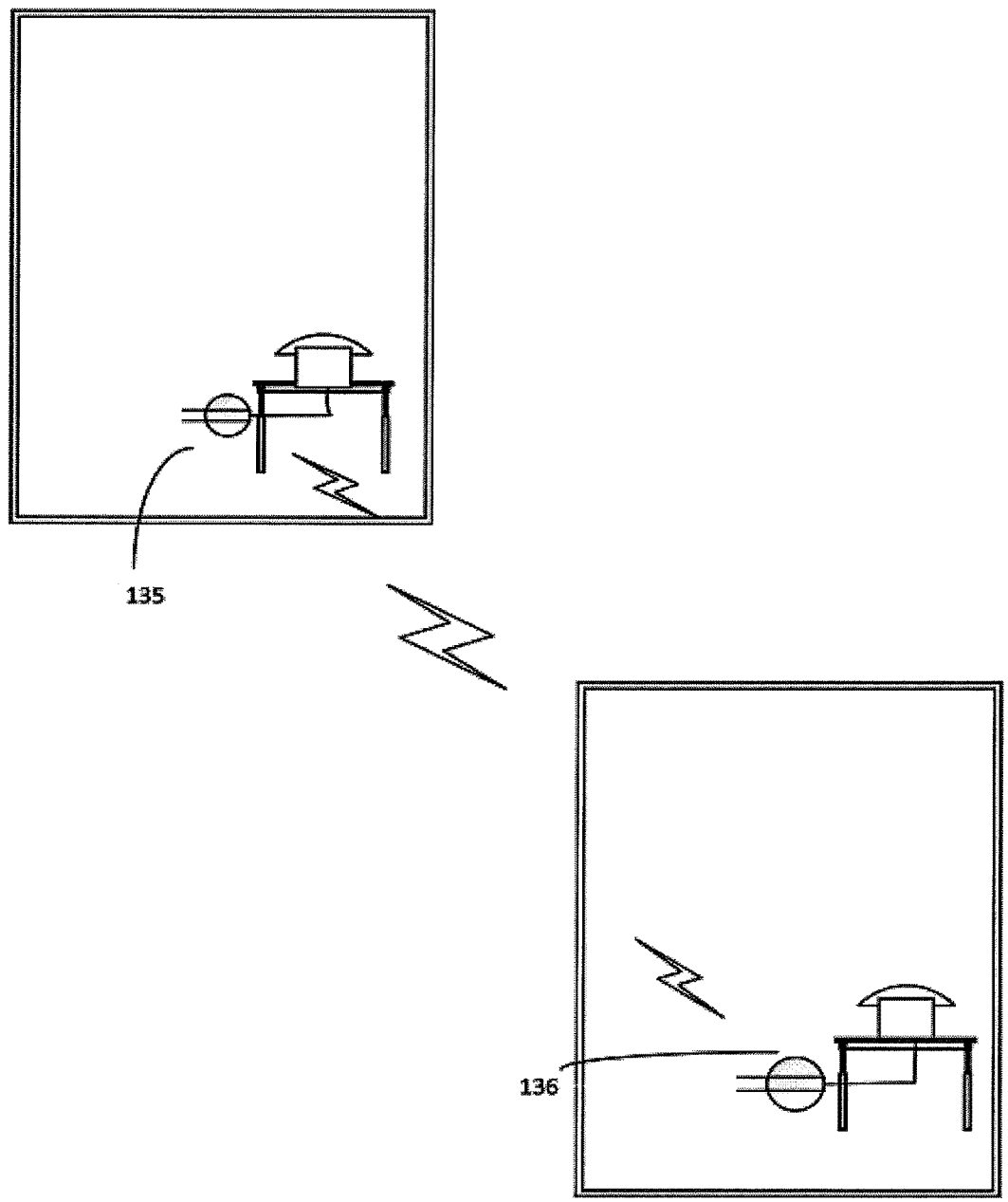
FIG. 12 shows the ability of the multipurpose wall outlet to facilitate calls within a building.

FIG. 12 illustrates the ability of the multipurpose wall outlet to facilitate calls over VOIP or cellular network to different rooms of the same building, wherein each room contains a multipurpose wall outlet of the present invention.

In some embodiments, the multipurpose wall outlet may substitute the at least one electrical socket for additional USB ports, ethernet jacks, VOIP telephony jacks, alone or in combination in order to provide various functionality in order to meet the needs of users.

Figure 13:
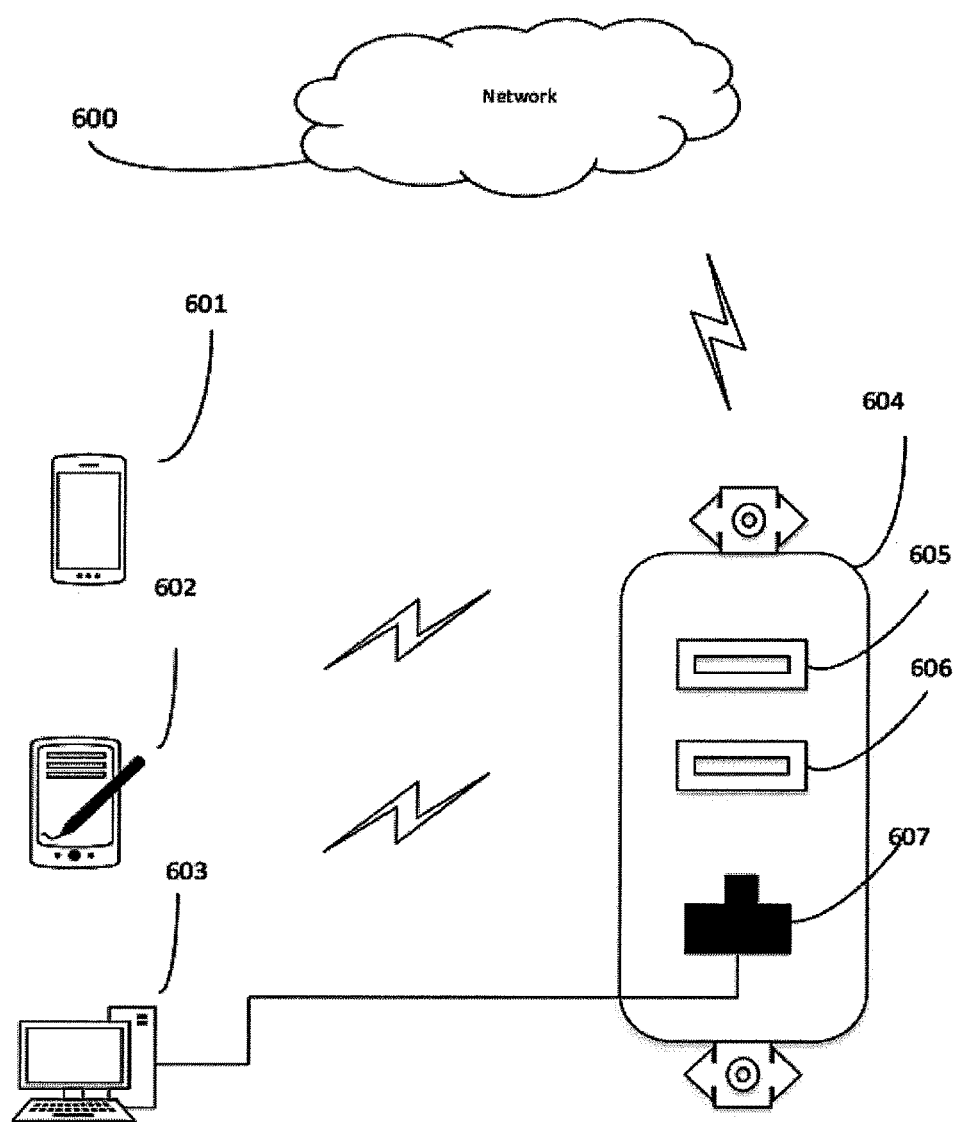
FIG. 13 shows the multipurpose wall outlet with USB ports and ethernet jack and providing a wireless data connection.

FIG. 13 shows an embodiment of the multipurpose wall outlet (604) with multiple USB ports (605, 606) and a ethernet jack (607). The multipurpose wall outlet is operatively coupled to a wireless data network (600) providing a wired internet connection to a desktop computer (603) and a wireless internet connection to a smart phone (601) and tablet computer (602).

Figure 14:
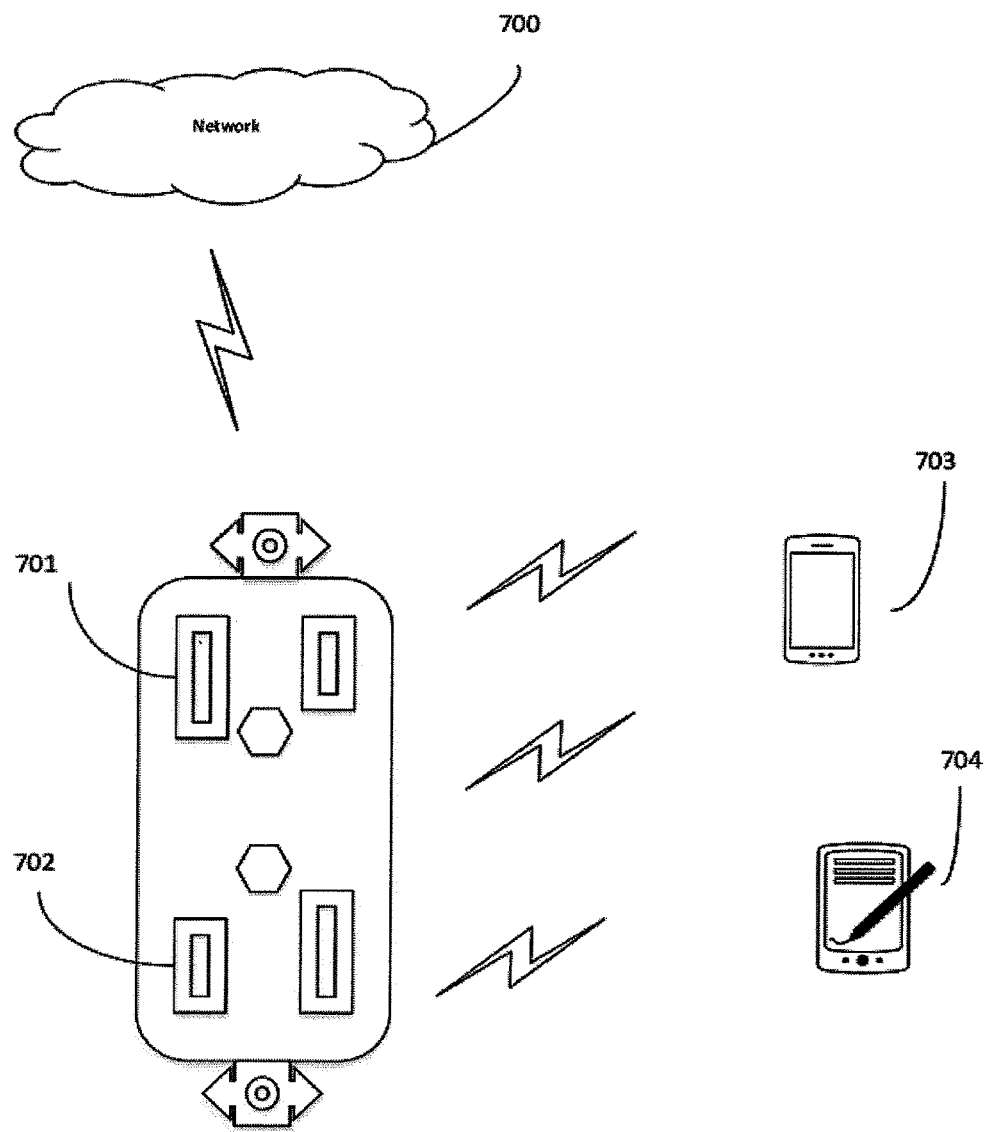
FIG. 14 shows the multipurpose wall outlet with multiple electrical sockets and providing a wireless data connection

FIG. 14 shows an embodiment of the multipurpose wall outlet with multiple electrical sockets (701, 702) for providing power to electrical devices. The multipurpose wall outlet is operatively coupled to a wireless data network (700) and is providing a wireless internet connection to a smart phone (703) and a tablet computer (704).

Figure 15:
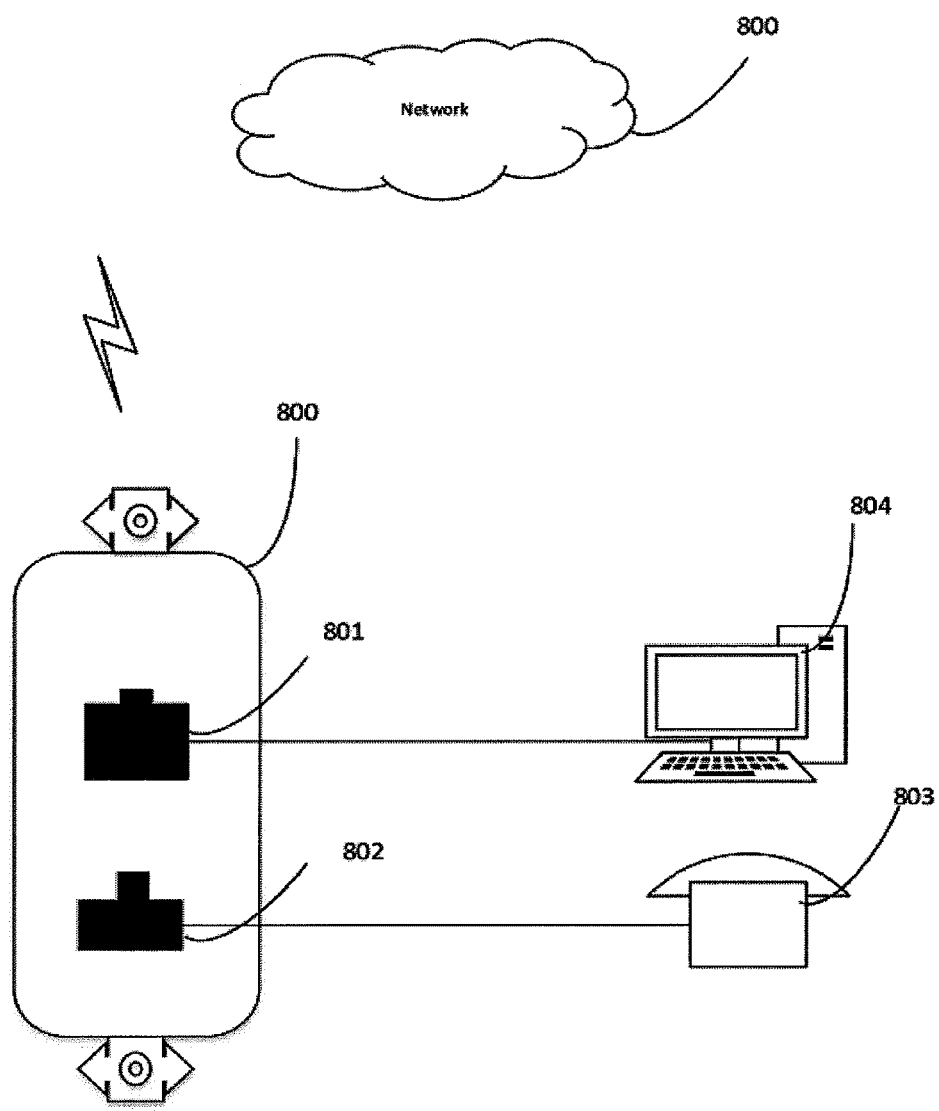
FIG. 15 shows the multipurpose wall outlet with an ethernet jack and a VOIP telephony jack and providing a wireless data connection.

FIG. 15 shows an embodiment of the multipurpose wall outlet with an ethernet port (801) providing a wired data connection to a desk top computer (804) and a VOIP telephony jack providing a VOIP connection to a telephone (803).

Figure 16:
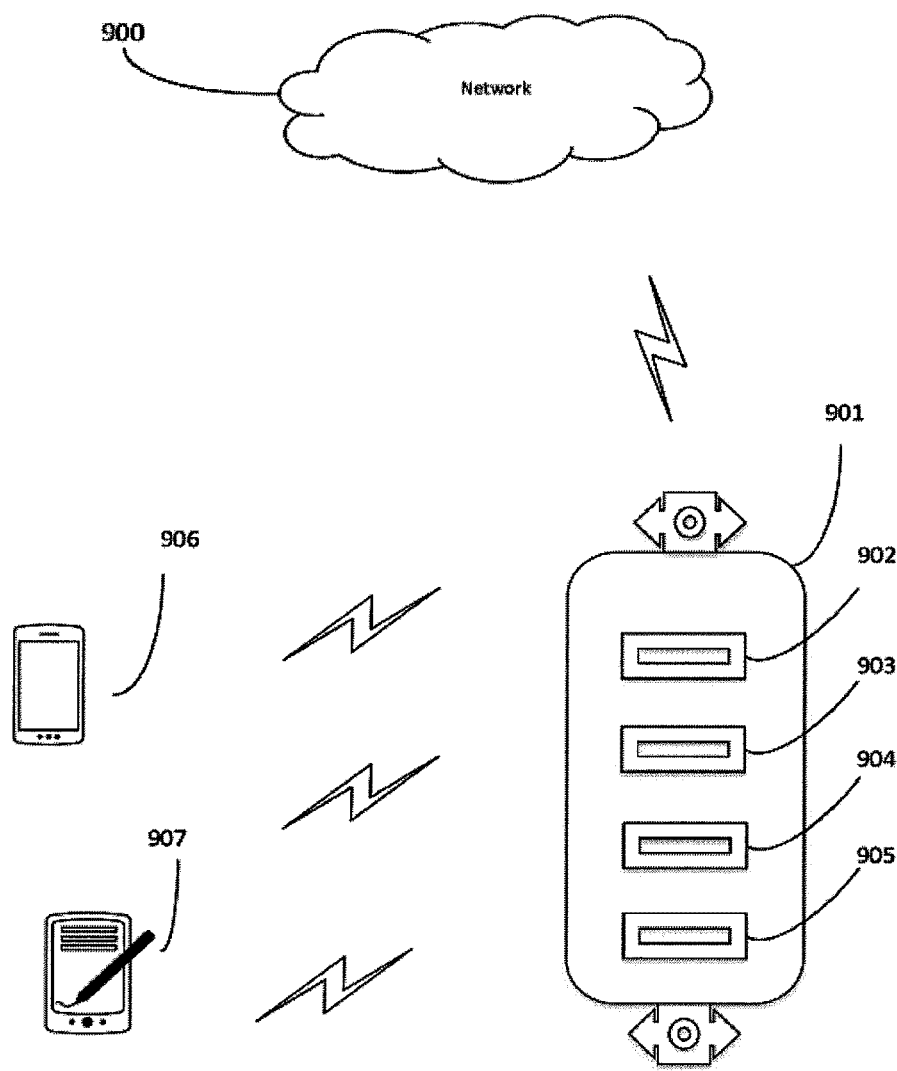
FIG. 16 shows the multipurpose wall outlet with multiple USB ports and providing a wireless data connection.

FIG. 16 shows an embodiment of the multipurpose wall outlet with multiple USB ports (902, 903, 904, 905) for providing power to USB enabled devices. The multipurpose wall outlet is operatively coupled to a wireless data network (900) and is providing a wireless internet connection to a smart phone (906) and a tablet computer (907).

In other embodiments, methods for providing power and/or data connections is provided. The methods of the present invention may involve the steps, in any combination of, installing the outlet of the present invention into a building or structure, providing an electrical connection to the outlet, providing a wired internet/network connection to the outlet, providing a wireless internet/network connection to the outlet (such as WiFi, nG, LTE, Wimax or the like), coupling networkable devices to the outlet wirelessly, and/or coupling networkable devices to the outlet via a wired connection. The method may comprise the steps of providing a network connection (wired or wireless) to networkable devices using the outlet of the present disclosure. The method may comprise providing an internet connection using the outlet of the present disclosure. The method may comprise providing VOIP service using the outlet of the present disclosure.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. For example: Linux-os, android-os, GNU/LINUX, KERNEL MICROSOFT WINDOWS, MS-DOS, CORE PROCESSOR, GNU, MIDDLEWARE CLIENT, FIREFOX BROWSER, LINUX, CHROME ANDROID, SEB PROTOCOLS, HTML 4 & 5 & 6, JAVASCRIPT, HTTP, SSL 2 & 3, IGMP V2 & V3, DHCP, SNMP, RTP/RTSP, SERVER MIDDLEWARE, SUBSCRIBER, MANAGEMENT SYSTEM WITH HTTP SERVER, TR-069 REMOTE MAINTENANCE REMOTE, CONFIGURATION OVER HTTP, IP MULTICAST, OTT LIVE, UNICAST, VOD RTSP, ADAPTIVE STREAMING, ENABLING ADAPTIVE STREAMING TO SILVERLIGHT, OTHER CLIENTS OVER HTTP, APPLE HTTP, TCP/UDP, PROCESSOR, MEMORY FLASH, MEMORY RAM, TBD, HARD DRIVE, SUBSYSTEM, EPC, IMS, QOS, ASTERISK BASED PBX, YMAX, CLEC, CMOS RF, VLSI, PLATFORMS, TELCO, SDK SOFTWARE PLATFORM, ENCODERSCMS, ISPS, APPS, DEVELOPERS, W, AUDIO, Bluetooth, ZIGBBE), ZWAVE, WIGIG, SIM INTERFACE, audio decoding G729, G721, G722, G729A SKYPE SILK or the like.

These and other systems, methods, objects, features, and advantages of the present disclosure will be apparent to those skilled in the art from the following detailed description of the embodiments and drawings.

The functions described herein including internet routing, voice over IP, and USB power delivery may be implemented in whole or in part. Each functional subsystem may be included or omitted depending on the desired application. Thus, power-only variants of the invention remain within the scope of the disclosed embodiments.

All documents mentioned herein are hereby incorporated in their entirety by reference. References to items in the singular should be understood to include items in the floral, and vise versa, unless explicitly stated otherwise or clear from the text. Grammatical conjunctions are intended to express any and all disjunctive and conjunctive combinations of conjoined clauses, sentences, words, and the like, unless otherwise stated or clear from context While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

With respect to the above, it is to be understood that the invention is not limited in its application to the details of construction and to the arrangement of the components listed or the steps set forth in the description or illustrated in the drawings. The various apparatus and methods of the disclosed invention are capable of other embodiments, and of being practiced and carried out in various ways that would be readily known to those skilled in the art, given the present disclosure. Further, the terms and phrases used herein are for descriptive purposes and should not be construed as in any way limiting.

As such, those skilled in the art will appreciate that the conception upon which this disclosure is based by be utilized as a basis for designing other inventions with similar properties. It is important therefore that the embodiments, objects, and claims herein, be regarded as including such equivalent construction and methodology insofar as they do not depart from the spirit and scope of the present invention.

It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

What is claimed is:

1. A multipurpose wall outlet for providing power to electrical devices, comprising:
    a support structure having a front side and a rear side configured for mounting to or plugging into a wall outlet receptacle of a building structure;
    at least one electrical output port mounted to the support structure, the electrical output comprising at least one universal serial bus (USB) port;
    at least one electrical outlet providing AC power mounted to the support structure;
    a housing having a front side, the housing being arranged so that the front side faces outward from the wall when the multipurpose wall outlet is mounted in the wall;
    at least one opening for mounting functions;
    at least one multipurpose wall outlet mounted in the support structure;
    a circuit board, mounted to the support structure, configured for providing power to electrical devices and in electrical communication with the at least one electrical output;
    a rear housing mounted to the rear side of the support structure;
    a connector coupled with the circuit board, wherein the connector is adapted to electrically couple to a power source for receiving electrical power having an alternating current (AC) first voltage from the power source;
    an electronic module comprising the circuit board and a smart chip for regulating and converting electrical output, wherein the electronic module further comprises a universal serial bus (USB) providing mediated electrical output power to at least one USB enabled device,
    wherein the at least one USB enabled device is directly coupled to the USB,
    wherein the smart chip is programmed with electrical converter functions, and wherein the USB is an electrical output; and
    a bridge mounted on the electronic module's circuit board and electrically coupled to the USB providing the mediated electrical output power to the at least one USB enabled device, and to the connector, wherein
    the multipurpose wall outlet is adapted, during operation, to:
        receive the electrical power having the AC first voltage from the power source;
        convert the electric power from the power source into a direct current (DC) current using the smart chip, wherein the bridge comprises at least one passivated bridge, wherein the bridge is directly coupled to a voltage controller, wherein the voltage controller divides the current into negative and positive components and is connected to a distributor which distributes power to various components of the circuit board and the multipurpose wall outlet, wherein the bridge is configured to directly bridge the converted DC current to the voltage controller which allows current to flow to the at least one electrical output, wherein
            the at least one electrical output comprises a USB port being operatively coupled to the circuit board and providing the USB mediated electrical output power, and wherein, the smart chip is configured to control a voltage of the converted electrical power from the USB port, and wherein the multipurpose wall outlet further comprises one or more converters controlled by the smart chip including analog to digital converters, and AC and DC converters to provide power delivery options to the USB port.

2. The multipurpose wall outlet of claim 1, wherein the power delivery options of the USB port include electrical output voltages in range between 5 vdc and 9 vdc.

* * * * *